United States Patent
Choi (10) Patent No.: US 8,713,852 B2
(45) Date of Patent: May 6, 2014

(54) INVISIBLE SLIDING DOOR

(71) Applicant: Hyundai Motor Company, Seoul (KR)

(72) Inventor: Jae Hong Choi, Gwangmyeong-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/673,745

(22) Filed: Nov. 9, 2012

(65) Prior Publication Data

US 2013/0152477 A1 Jun. 20, 2013

(30) Foreign Application Priority Data

Dec. 14, 2011 (KR) .................. 10-2011-0134801

(51) Int. Cl.
*E05D 15/10* (2006.01)
(52) U.S. Cl.
USPC ............... 49/360; 49/216; 49/218; 49/221; 296/155; 296/146.11
(58) Field of Classification Search
USPC ........... 49/149, 152, 153, 208–210, 216, 218, 49/219, 221–223, 360; 296/146.11, 296/146.12, 155
See application file for complete search history.

(56) References Cited

U.S. PATENT DOCUMENTS

| | | | | |
|---|---|---|---|---|
| 3,883,992 | A * | 5/1975 | Bollinger, Sr. | 49/362 |
| 4,502,246 | A * | 3/1985 | Minami | 49/322 |
| 7,611,190 | B1 * | 11/2009 | Elliott et al. | 296/155 |
| 7,748,770 | B2 * | 7/2010 | Heuel et al. | 296/155 |
| 7,856,759 | B2 * | 12/2010 | Elliott et al. | 49/358 |
| 8,011,136 | B2 * | 9/2011 | Fukumura et al. | 49/360 |
| 8,096,606 | B2 * | 1/2012 | Hanaki et al. | 296/155 |
| 8,141,297 | B2 * | 3/2012 | Elliott et al. | 49/358 |
| 8,469,441 | B2 * | 6/2013 | Heuel et al. | 296/155 |
| 2009/0200833 | A1 | 8/2009 | Heuel et al. | |
| 2011/0061304 | A1 * | 3/2011 | Elliott et al. | 49/358 |
| 2011/0198883 | A1 * | 8/2011 | Heuel et al. | 296/149 |

FOREIGN PATENT DOCUMENTS

| | | | |
|---|---|---|---|
| JP | 2005-256441 A | 9/2005 | |
| JP | 2007-190990 A | 8/2007 | |
| JP | 2008-114679 A | 5/2008 | |
| KR | 10-2004-0099934 A | 12/2004 | |
| KR | 10-2011-0053023 A | 5/2011 | |

* cited by examiner

*Primary Examiner* — Katherine Mitchell
*Assistant Examiner* — Abe Massad
(74) *Attorney, Agent, or Firm* — Morgan, Lewis & Bockius LLP (57) ABSTRACT

A sliding door may include a rail slidably supported by a rail anchor, a body part fixed to the rail, a main arm hinge-connected with the body part, a driving bar hinge-connected with the body part, a first link hinge-connected with the main arm and the driving bar, a second link hinge-connected with the main arm and a first slot of the driving bar, a door part hinge-connected with the main arm and having a second slot hinge-connected with the second link through the first slot, a gear part of the main bar, a first drum engaged to the gear part, a first cable connected with the first drum and the rail anchor, a second drum rotatably mounted at the rail, a second cable wound around the second drum and connected with the first drum, and a third cable connected with the second drum and the rail anchor.

6 Claims, 10 Drawing Sheets

INVISIBLE SLIDING DOOR

CROSS-REFERENCE TO RELATED APPLICATION

The present application claims priority to Korean Patent Application No. 10-2011-0134801, filed on Dec. 14, 2011, the entire contents of which is incorporated herein for all purposes by this reference.

BACKGROUND OF THE INVENTION

1. Field of the Invention

The present invention relates to a sliding door enabling a sliding operation without mounting a rail in respects to improving an appearance of a car body by modularizing a sliding system into a sliding door.

2. Description of Related Art

A van such as Carnival is mounted with a sliding door, which has a structure in which a guide rail is mounted in a car body. Since the guide rail is mounted in the car body, the corresponding sliding door structure may not be applied to an SUV or a car other than the van and even though the structure is mounted in the VAN, the guide rail is exposed, which results in spoiling an aesthetic appearance of the car.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door enabling a sliding operation without using a guide rail by modularizing a sliding system into the door rather than removing the guide rail mounted in a car body from the sliding door structure according to the related art.

In an aspect of the present invention, a sliding door may include a bar-shaped rail slidably supported by a rail anchor mounted in a vehicle, a body part fixed to one end of the rail, a main arm having one end hinge-connected with a rear of the body part, a driving bar having one end hinge-connected with a front of the body part, a first link having both ends hinge-connected with a middle region of the main arm and a middle region of the driving bar respectively, a second link having one end hinge-connected with a middle region of the main aim and the other end hinge-connected with a first slot formed at the other end of the driving bar, a door part having one end hinge-connected with the other end of the main arm and having the other end formed with a second slot hinge-connected with the other end of the second link through the first slot, a gear part formed at the one end of the main bar hinge-connected with the body part and rotated together with the main bar, a first drum rotatably mounted to the body part and engaged to the gear part to be rotated by the gear part, a first cable having both ends each connected with the first drum and the rail anchor and slidably moving the rail in a rail anchor direction while being wound around the first drum at the time of a rotation of the first drum, a second drum rotatably mounted at the other end of the rail, a second cable having one end wound around the second drum and having the other end connected with the first drum to rotate the second drum while being released from the second drum, simultaneously with being wound around the first drum at the time of a reverse rotation of the first drum, and a third cable having both ends each connected with the second drum and the rail anchor and slidably moving the rail so as to return to an original position while being wound around the second drum at the time of the rotation of the second drum.

A hinge connection of the first slot formed at the other end of the driving bar and the second link and a hinge connection of the second slot formed at the other end of the door part and the second link are performed by the same hinge pin, A hinge point of the second link and the main arm is disposed farther away from the one end of the main arm than a hinge point of the first link and the main arm, wherein the first slot may have a straight shape along a length direction of the driving bar, and wherein the second slot is formed along a plane direction of the door part.

The second slot may have an arc shape in which a middle portion thereof is protrudedly formed toward the rail.

The rail is coupled with the rail anchor to be slid in a front and back direction of the vehicle, the one end of the main arm is fixedly mounted with a sector gear, a turning force of the main arm generated when the door is opened is transferred through the sector gear and a driving force of the sector gear is a driving source going the rail backward, and a turning force of the main arm generated when the door is closed is transferred through the sector gear and the driving force of the sector gear is a driving source going the rail forward.

The door part is provided with a hook, and the hook is coupled with a pin mounted in the vehicle when the door mounted at the door part is closed.

The sliding door may further include a locking part provided with a sawtooth mounted at one side of the rail, a latch unit mounted in the vehicle and elastically supported by a spring and fixing the rail while the rail is locked to the sawtooth of the locking part when the rail slidably moves, and a fourth cable connecting a door handle with the latch part and unlocking the locking with the sawtooth by rotating the latch part when the door handle is pulled.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

A sliding door according to an exemplary embodiment of the present invention is configured to include a bar-shaped rail supported by a rail anchor mounted in a vehicle, a body part attached to one end of the rail, a main arm having one end hinge-connected with a rear of the body part, a driving bar having one end hinge-connected with a front of the body part, a first link having both ends hinge-connected with a middle region of the main arm and a middle region of a driving arm, a second link having one end hinge-connected with a middle region of the body part and the other end hinge-connected with a first slot formed at the other end of the driving bar, and a door part having one end hinge-connected with the other end of the body part and having the other end formed with a second slot hinge-connected with the other end of the second link, a gear part rotated together with the main bar at the end of the main bar hinge-connected with the body part, a first drum fixed to the body part and rotated by the gear part, a first cable having both ends each connected with the first drum and the rail anchor and slidably moving a rail in a rail anchor direction while being wound around the first drum at the time of the rotation of the first drum, a second drum mounted at the other end of the rail, a second cable having one end wound around the second drum and having the other end connected with the first drum to rotate the second drum while being released from the second drum, simultaneously with being wound around the first drum at the time of the reverse rotation of the first drum, and a third cable having both ends each connected with the second drum and the rail anchor and slidably moving the rail so as to return to an original position while being wound around the second drum at the time of the rotation of the second drum.

As described above, the invisible sliding door according to the exemplary embodiment of the present invention has a swing door structure, a sliding door structure, a hold door structure, and a latch door structure and therefore, is opened and held while being swung, simultaneously with the sliding moving of the door when the door is opened.

[Swing Door Structure]

Figure 1:
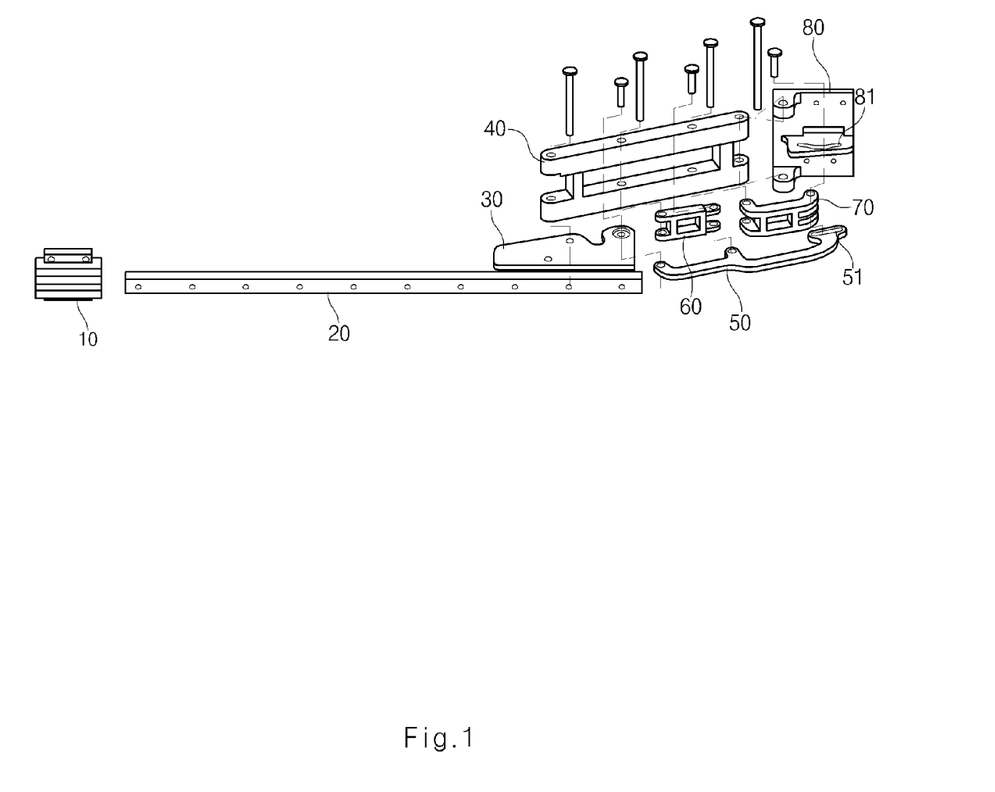
FIG. 1 is an exploded perspective view of a swing door connection part according to an exemplary embodiment of the present invention.

A swing door structure according to an exemplary embodiment of the present invention is configured to include a bar-shaped rail 20 supported by a rail anchor 10 mounted in a vehicle, a body part 30 attached to one end of the rail, a main arm 40 having one end hinge-connected with a rear of the body part, a driving bar 50 having one end hinge-connected with a front of the body part, and a first link 60 having both ends hinge-connected with a middle region of the main arm and a middle region of the driving arm.

The body part 30, the main arm 40, the driving bar 50, and the first link 60 have a 4-bar link shape, such that the main arm 40 and the driving bar 50 moves by the movement of the 4-bar link.

Further, the swing door structure according to the exemplary embodiment of the present invention is configured to include a second link 70 having one end hinge-connected with the middle region of the main body and having the other end hinge-connected with a first slot 51 formed at the other end of the driving bar 50 and a door part 80 having one end hinge-connected with the other end of the body part and having a second slot 81 formed at the other end thereof hinge-connected with the other end of the second link, wherein a hinge point of the second link and the main arm is disposed farther away from the main arm than a hinge point of the first link and the main arm and the hinge connection with the first slot 51 disposed at the other end of the driving bar and the second link and the hinge connection with the second slot disposed at the other end of the body part and the second link are made by the same hinge pin 71.

As described above, the main arm 40 and the driving bar 50 moves by the movement of the 4-bar link. The ends of the main arm 40 and the driving bar 50 moving as described above are hinge-connected with the door part 80. In particular, the driving bar 50 and the door part 80 are hinge-connected with each other through the first slot 51 and the second slot 81, such that the door part 80 can ensure a degree of freedom so as to provide the rotation based on the hinge connection portion of the door part 80 and the main arm 40 within a range of the first slot 51 regardless of the movement of the 4-bar link.

Ensuring different degrees of freedom relates to an angle of the door part 80 during the opening and closing of the door. For example, in order to prevent the profile opening the door from interfering with the car body, there is a need to control the angle of the door part 80.

The degree of freedom by the first slot 51 and the second slot 81 is limited by the second link to control the angle of the door part 80.

That is, when a distance between a predetermined position of the main arm 40 and the hinge connection part of the first slot 51 and the second slot 81 is limited by the second link 70, the door part 80 rotates at an angle corresponding to a rotation angle of the main arm 40 according to the rotation of the main arm.

Figure 2:
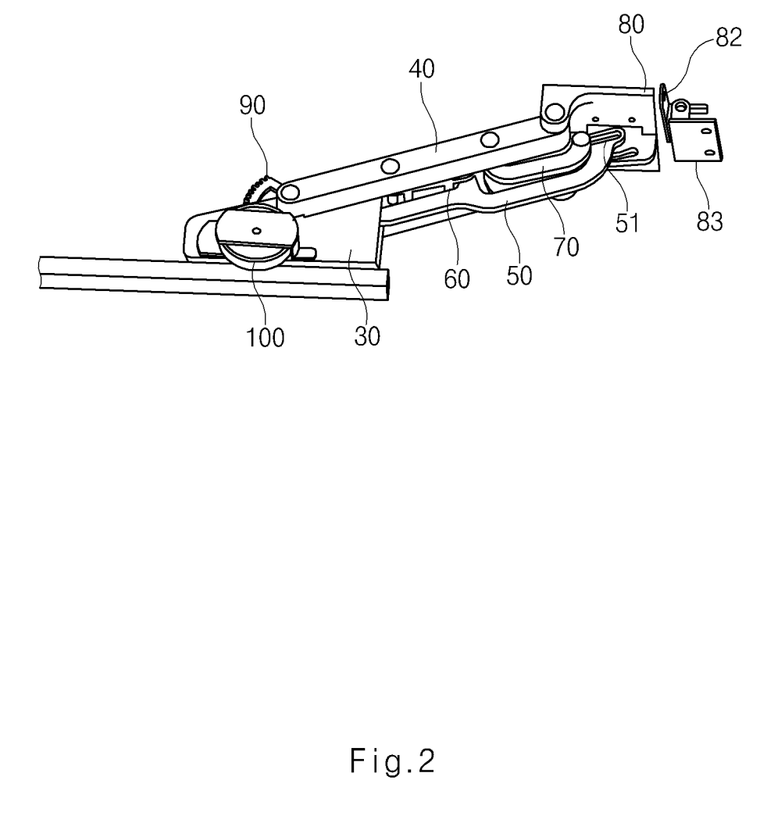
FIG. 2 is a diagram showing a swing door system in a state in which the sliding door according to the exemplary embodiment of the present invention is closed.
Figure 3:
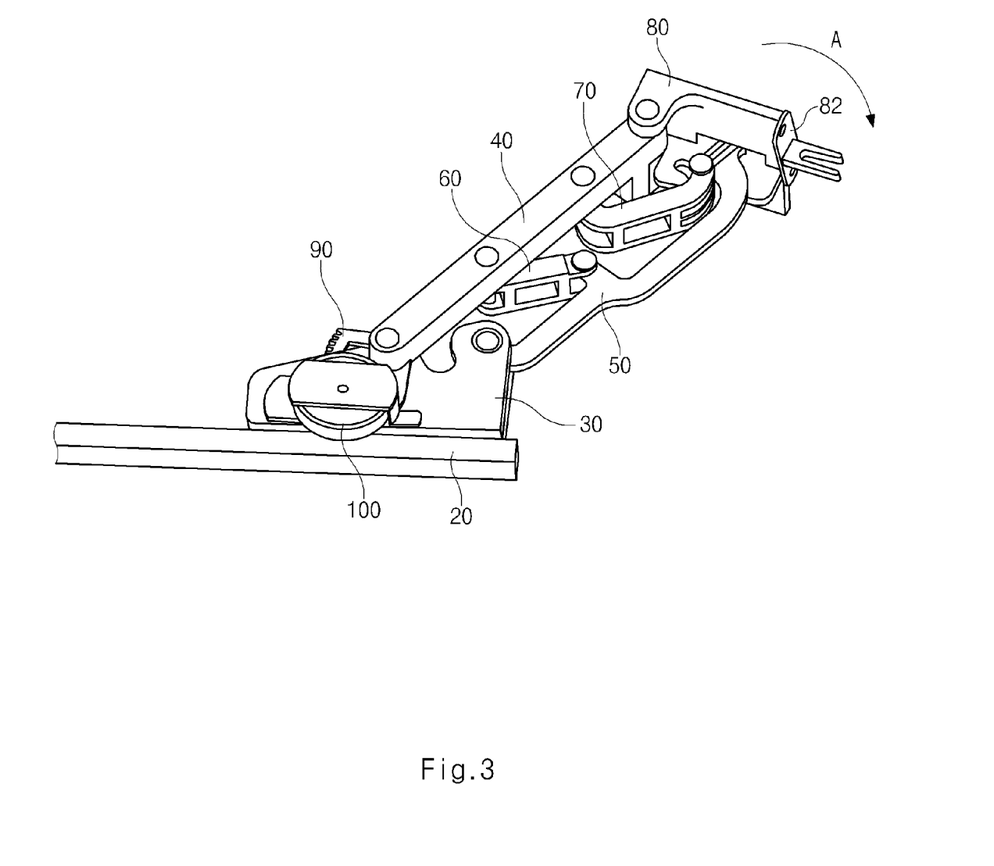
FIG. 3 is a diagram showing the swing door system during the opening of the sliding door according to the exemplary embodiment of the present invention.
Figure 4:
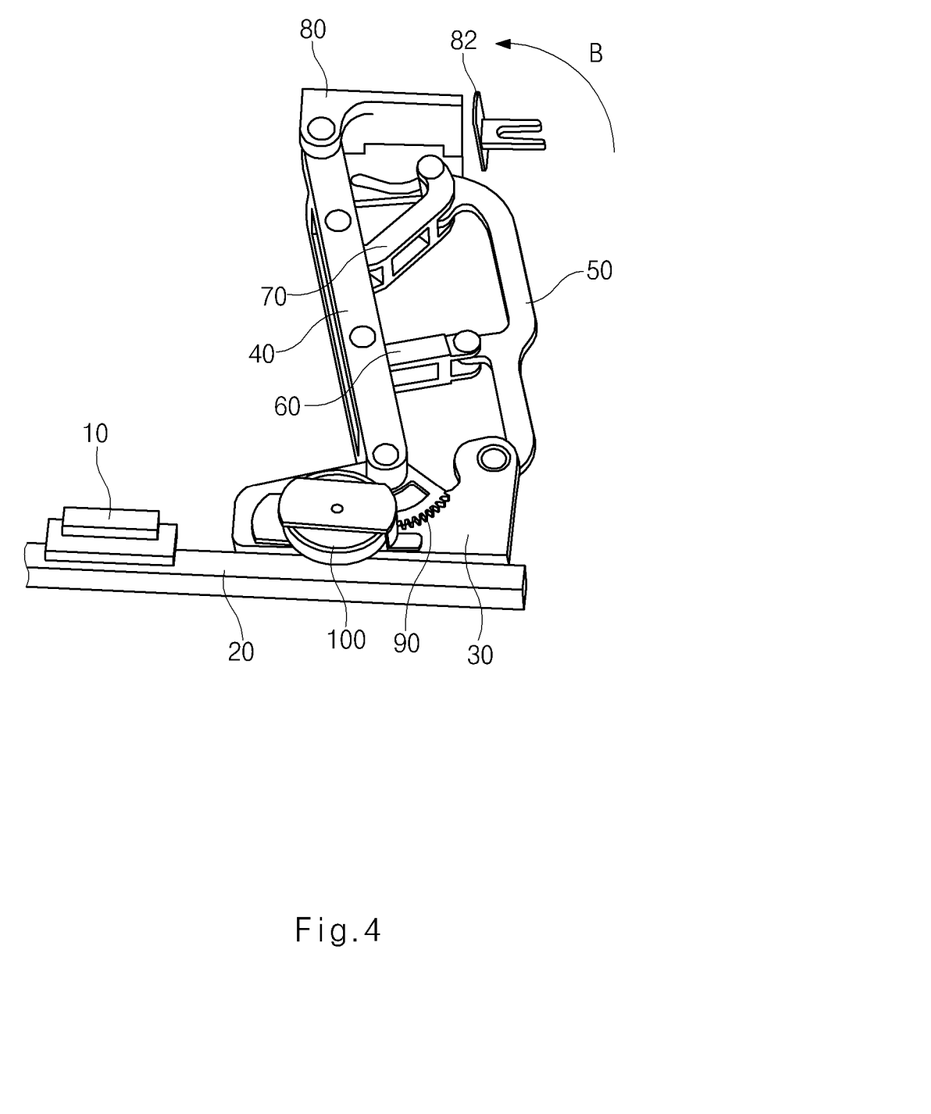
FIG. 4 is a diagram showing the swing door system in a state in which the sliding door according to the exemplary embodiment of the present invention is completely opened.
Figure 5:
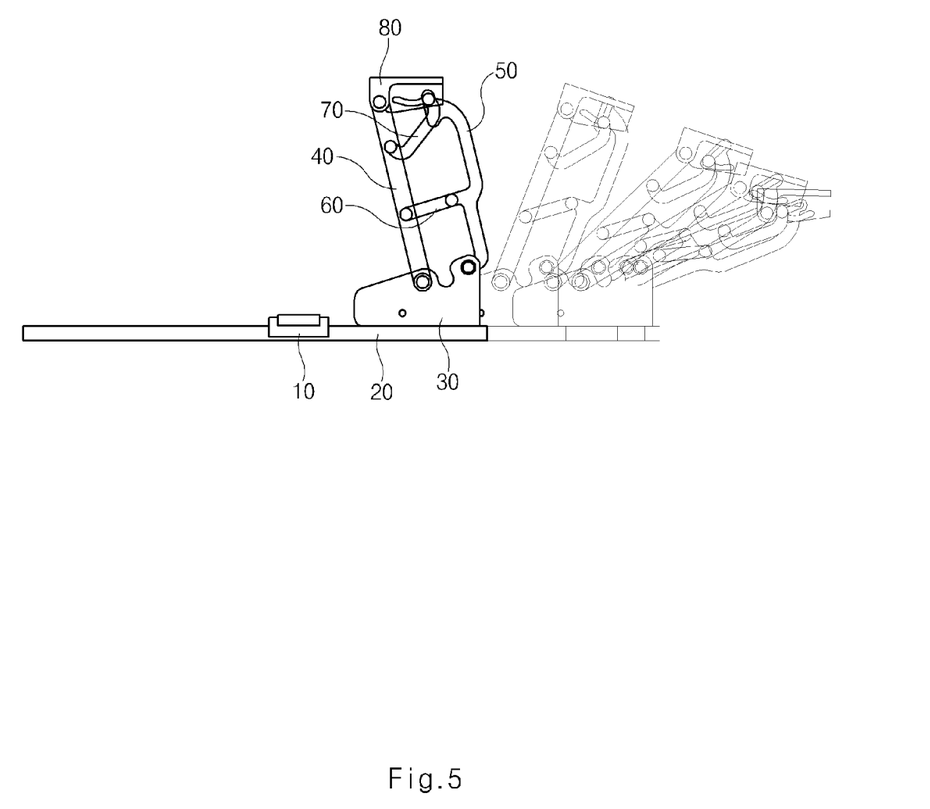
FIG. 5 is an opening and closing profile of the swing door according to the exemplary embodiment of the present invention.

Therefore, the exemplary embodiment of the present invention manufactures the first slot 51 in a straight form along a length direction of the driving bar 50 and manufactures the second slot 81 so as to be formed along a front and back length direction in a plane of the door part 80, such that the rear of the door slight rotates in direction A farther away from the car body than the front of the door as shown in FIG. 3 in the state in which the door part 80 is horizontal to the car body as shown in FIG. 2 when the main arm 40 rotates during the opening of the door and then, rotates in direction B in which the door part is in a horizontal state again as shown in FIG. 4.

In this case, when the second slot 81 has an arc shape in which a middle portion thereof is protrudedly formed to the car body, a rotational amount A of the second slot may be reduced by a protruded degree, as compared with a shape in which the second slot is simply straight.

The advantages of the swing door can minimize a distance at which the door is far away from the car body. On the other hand, the interference with the car body needs to be avoided when the door is opened. A designer can control the shape of the second slot during the design process in consideration of the facts to control the rotational amount of the door during the opening of the door.

[Latch Door Structure]

Figure 7:
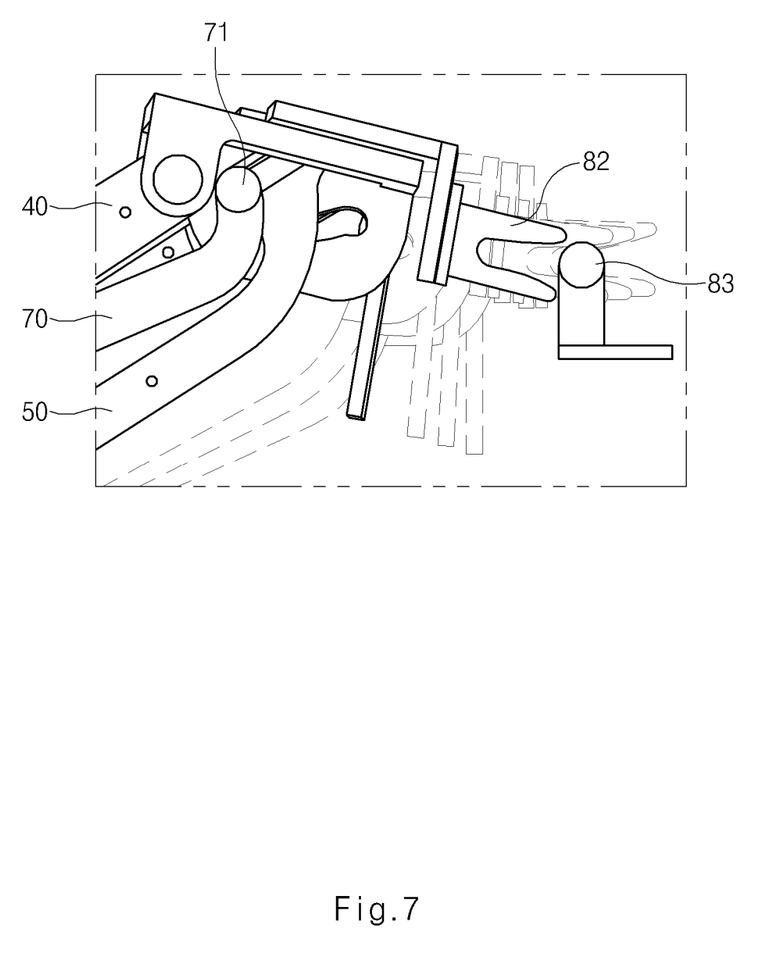
FIG. 7 is a diagram showing a latch door structure according to an exemplary embodiment of the present invention.

Next, the latch door structure according to the exemplary embodiment of the present invention is configured to include a hook 82 mounted at an end of a door part 80 and a fixing pin 83 mounted in a vehicle and locked due to the hook 82 inserted thereinto.

That is, as shown in FIG. 3, in the latch door structure according to the exemplary embodiment of the present invention, the door part 80 is rotated in a direction A to be slightly inclined, such that the hook 82 is inserted into the fixing pin 83 in a vertically inclined state. Thereafter, the hook 82 is leveled so as to be inserted into the fixing pin 83 while the door part 80 is horizontally rotated in a direction B.

Therefore, the latch door structure may stably lock or unlock the door using the sliding door structure that is rotated by a four bar link.

[Sliding Door Structure]

Figure 6:
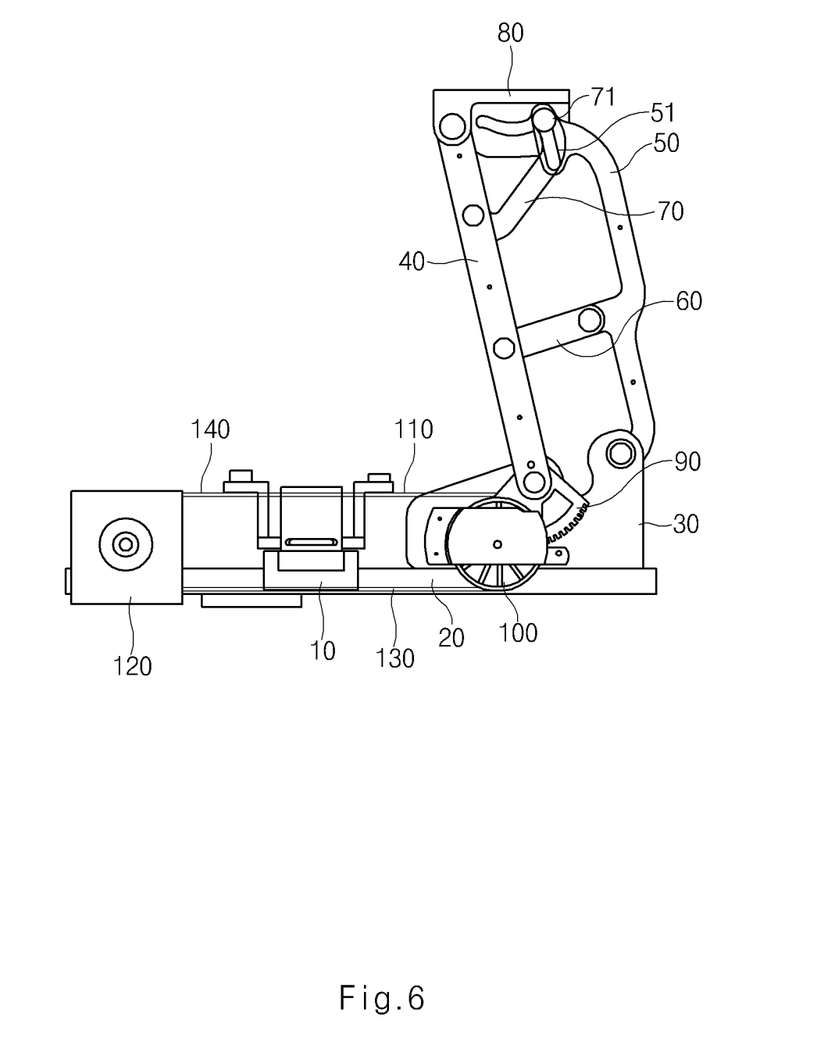
FIG. 6 is a diagram showing a sliding door structure according to an exemplary embodiment of the present invention.

Next, the sliding door structure according to the exemplary embodiment of the present invention is configured to include a gear part 90 rotated together with the main bar 40 at the end of the main bar 40 hinge-connected with the body part 30, a first drum 100 rotatably connected to the body part 30 and engaged to and rotated by the gear part 90, a first cable 110 having both ends each connected with the first drum 100 and the rail anchor 10 and slidably moving a rail 20 in a rail anchor direction (a rear of a vehicle) while being wound around the first drum 100 at the time of the rotation of the first drum 100, a second drum 120 rotatably mounted at the other end of the rail, a second cable 130 having one end wound around the second drum 120 and having the other end connected with the first drum 100 to rotate the second drum 120 while being released from the second drum 120, simultaneously with being wound around the first drum 100 at the time of the reverse rotation of the first drum 100, and a third cable 140 having both ends each connected with the second drum 120 and the rail anchor 10 and slidably moving the rail 20 so as to return to an original position (a front of a vehicle) while being wound around the second drum 120 at the time of the rotation of the second drum 120.

That is, in the sliding door structure according to the exemplary embodiment of the present invention, the gear part 90 is rotated together with the main bar 40 at the time of the rotation of the main bar 40 and the first cable 110 is wound around the first drum 100 while the first drum 100 is rotated by the gear part 90 and the rail 20 slidably moves to a rear of a vehicle while the first cable 110 is wound.

Thereafter, the gear part 90 is rotated together with the main bar 30 at the time of the reverse rotation of the main bar 30, the second cable 130 is wound around the first drum 100 while the first drum 100 is reversely rotated by the gear part 90 and the second drum 120 is rotated while the second cable 130 is wound and the third cable 140 is wound around the second drum 120 while the second drum 120 is rotated, the rail slidably moves in a front of a vehicle while the third cable 130 being wound around the second drum 120 so as to return to an original position.

Therefore, the sliding door structure according to the exemplary embodiment of the present invention opens the door by slidably moving the door to the rear of the vehicle while swinging the door.

[Hold Door Structure]

Figure 8:
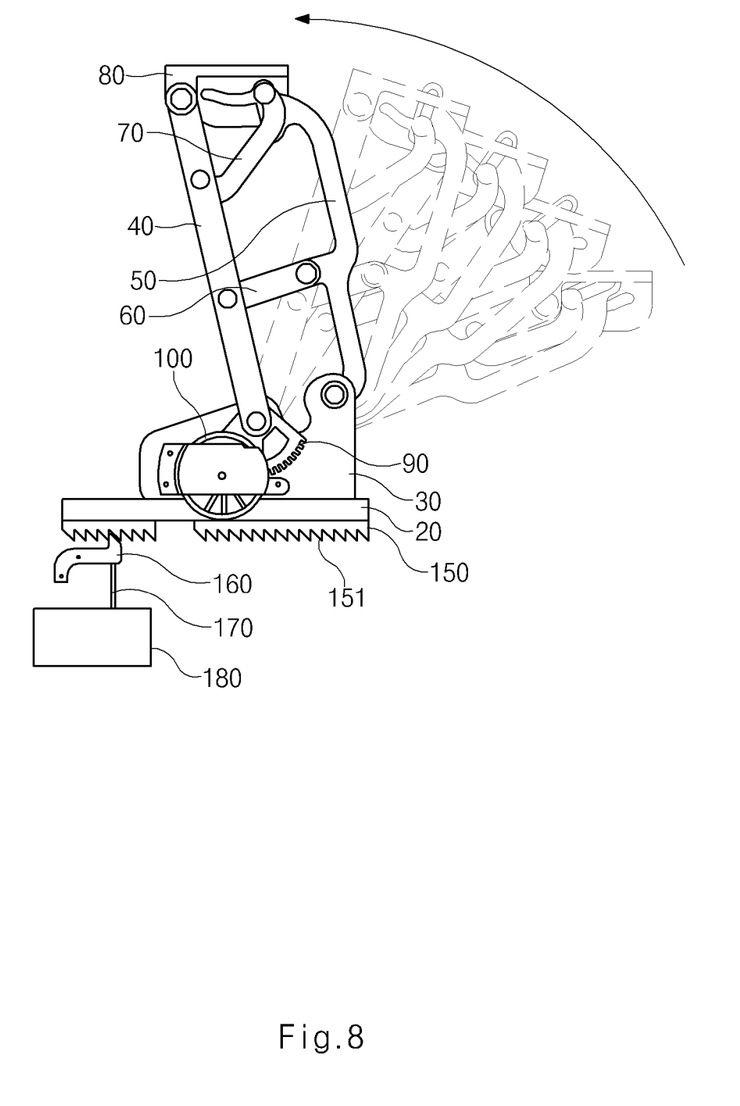
FIG. 8 is a diagram showing a hold door structure according to an exemplary embodiment of the present invention.
Figure 9:
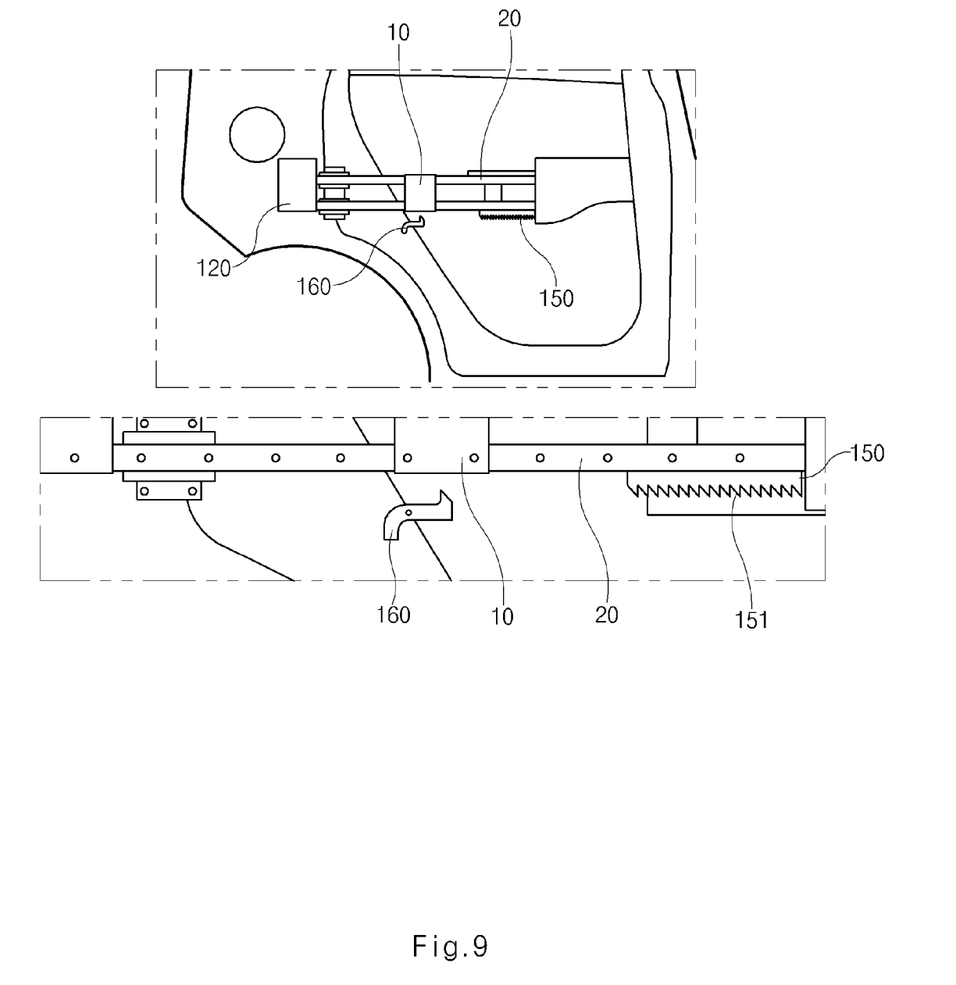
FIG. 9 is a diagram showing a swing door close state of the hold door structure of the exemplary embodiment of the present invention.
Figure 10:
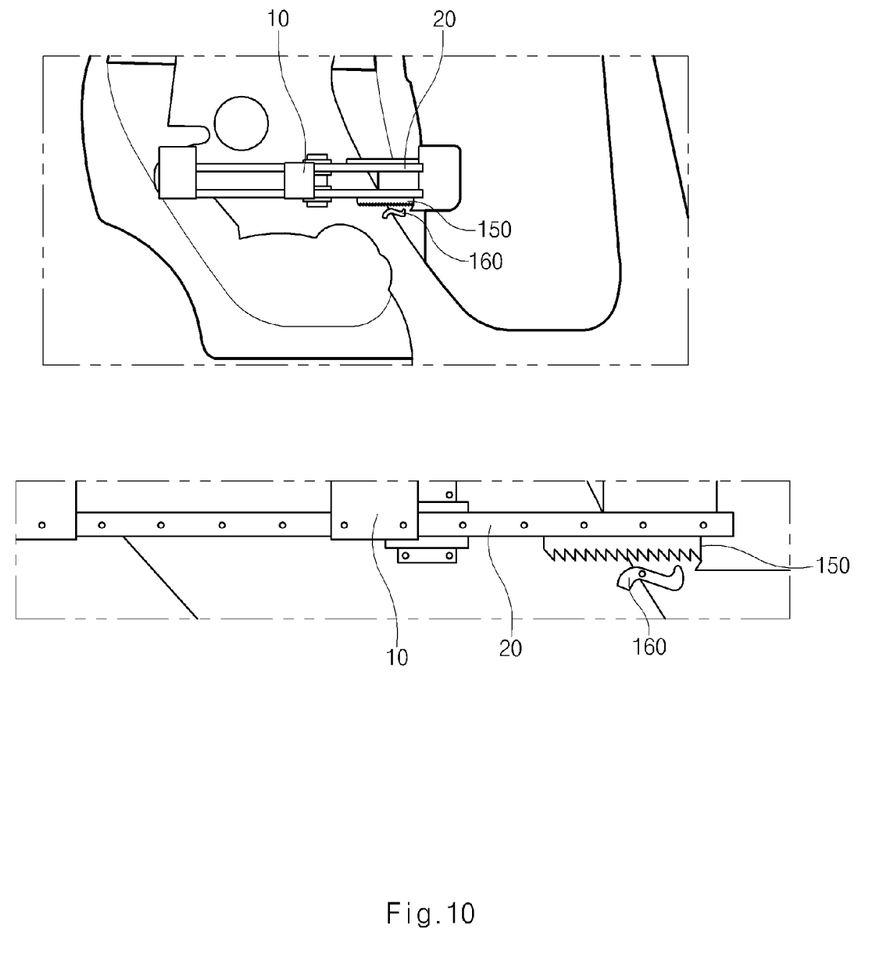
FIG. 10 is a diagram showing a swing door open state of the hold door structure of the exemplary embodiment of the present invention.

Next, the hold door structure of the exemplary embodiment of the present invention includes a locking part 150 provided with a sawtooth 151 mounted at one side of the rail 20, a latch unit 160 mounted in a vehicle and elastically supported by a spring and fixing the rail 20 while the rail 20 is locked to the sawtooth 151 of the locking part 150 when the rail 20 slidably moves, and a fourth cable 170 connecting the door handle 180 with the latch part 160 and unlocking the locking with the sawtooth 151 by rotating the latch part 160 when the door handle 180 is pulled.

That is, the hold door structure according to the exemplary embodiment of the present invention fixes the rail 30 while the sawtooth 151 of the locking part 150 is locked to the latch part 160 when the rail 30 slidably moves and then, rotates the latch part 160 while the fourth cable 170 is pulled when the door handle is pulled to slidably move the rail while the locking of the locking part 150 locked to the latch part 160 is released.

As described above, the invisible sliding door according to the exemplary embodiment of the present invention rotates the door backward in a horizontal state by the swing door structure when the door is pulled backward while the door handle is pulled and at the same time, is opened while the door slidably rotates backward by the sliding door structure. In this case, the door is fixed in the opened state by the hold door structure.

Thereafter, the fixing of the hold door structure is released when the door handle is pulled and in this state, when the door is pulled forward, the door is closed during the movement by being swung while slidably moving by the swing door structure and the sliding door structure. In this case, the door may be stably closed by the hold door structure.

According to the exemplary embodiments of the present invention, the sliding door can be mounted even in a car or an SUV by removing the guide rail of the sliding door, thereby increasing the convenience of a user.

In particular, the sliding door can increase the convenience of getting on and off even in a parking space at which a distance from cars alongside mine is narrow, can be completely opened to secure a wide getting on/off space, and previously prevent accidents with following vehicles, such as a motorcycle, a bicycle, and the like, due to the opening and closing of the door.

Further, the manufacturer can ensure a larger degree of freedom in a design even in a vehicle in which the sliding door is mounted and can implement various door types.

For convenience in explanation and accurate definition in the appended claims, the terms "upper", "lower", "inner", "outer", "front", "rear", and "back" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door, comprising:
   a rail slidably supported by a rail anchor mounted in a vehicle;
   a body part fixed to a first end of the rail;
   a main arm having a first end hinge-connected with a rear of the body part;
   a driving bar having a first end hinge-connected with a front of the body part;
   a first link having a first end hinge-connected with a middle region of the main arm and a second end hinge-connected with a middle region of the driving bar;
   a second link having a first end hinge-connected with a middle region of the main arm and a second end hinge-connected with a first slot formed at a second end of the driving bar;
   a door part having a first end hinge-connected with a second end of the main arm and having a second end formed with a second slot hinge-connected with the second end of the second link and the second end of the driving bar through the first slot;
   a gear part formed at the first end of the main bar hinge-connected with the body part and rotated together with the main bar;
   a first drum rotatably mounted to the body part and engaged to the gear part to be rotated by the gear part;
   a first cable having a first end connected with the first drum and a second end connected with the rail anchor and slidably moving the rail in a rail anchor direction while being wound around the first drum at the time of a rotation of the first drum;
   a second drum rotatably mounted at a second end of the rail;
   a second cable having a first end wound around the second drum and having a second end connected with the first drum to rotate the second drum while being released from the second drum, simultaneously being wound around the first drum at the time of a reverse rotation of the first drum; and
   a third cable having a first end connected with the second drum and a second end connected with the rail anchor and slidably moving the rail so as to return to an original position while being wound around the second drum at the time of the rotation of the second drum,
   wherein the hinge-connection of the second link and the main arm is disposed farther away from the first end of the main arm than the hinge-connection of the first link and the main arm,
   wherein the first slot has a straight shape along a length direction of the driving bar, and
   wherein the second slot is formed along a plane direction of the door part.

2. The sliding door of claim 1, wherein the first slot formed at the second end of the driving bar, the second end of the second link, and the second slot formed at the second end of the door part are hinge-connected by a hinge pin.

3. The sliding door according to claim 2, wherein the second slot has an arc shape in which a middle portion thereof is protrudedly formed toward the rail.

4. The sliding door according to claim 1, wherein the rail is coupled with the rail anchor to be slid in a front and back direction of the vehicle,
   a sector gear is fixed to the first end of the main arm,
   a turning force of the main arm generated when the door is opened is transferred through the sector gear and a driving force of the sector gear is a driving source moving the rail backward, and
   a turning force of the main arm generated when the door is closed is transferred through the sector gear and the driving force of the sector gear is a driving source moving the rail forward.

5. The sliding door of claim 2,
   wherein the door part is provided with a hook, and
   wherein the hook is coupled with a pin mounted in the vehicle when the door, which is mounted at the door part, is closed.

6. The sliding door of claim 2, further comprising:
   a sawtooth fixed to a first side of the rail;
   a latch unit mounted in the vehicle and elastically supported by a spring and configured to lock to the sawtooth to fix the rail; and
   a fourth cable connecting a door handle with the latch unit and configured to unlock the sawtooth by rotating the latch unit when the door handle is pulled.

* * * * *